United States Patent
Noldus et al.

(10) Patent No.: US 8,270,587 B2
(45) Date of Patent: Sep. 18, 2012

(54) METHOD AND ARRANGEMENT FOR CAPTURING OF VOICE DURING A TELEPHONE CONFERENCE

(75) Inventors: Rogier Noldus, Goirle (NL); Jos den Hartog, Capelle a/d IJssel (NL); Yun Chao Hu, Bromma (SE); Ard-Jan Moerdijk, Rijen (NL); Jan van der Meer, Rijen (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 609 days.

(21) Appl. No.: 12/095,737

(22) PCT Filed: Oct. 31, 2005

(86) PCT No.: PCT/NL2005/050027
§ 371 (c)(1),
(2), (4) Date: Nov. 18, 2009

(87) PCT Pub. No.: WO2007/053003
PCT Pub. Date: May 10, 2007

(65) Prior Publication Data
US 2010/0220844 A1   Sep. 2, 2010

(51) Int. Cl.
*H04M 3/42* (2006.01)

(52) U.S. Cl. .............. 379/202.01; 370/260; 709/204

(58) Field of Classification Search ............ 379/202.01, 379/206.01; 370/260; 709/204
See application file for complete search history.

(56) References Cited

U.S. PATENT DOCUMENTS

| 5,915,091 | A | 6/1999 | Ludwig et al. |
| 7,310,517 | B2 | 12/2007 | Wolff et al. |
| 8,045,728 | B2 * | 10/2011 | Wada et al. ................. 381/77 |
| 2002/0026521 | A1 * | 2/2002 | Sharfman et al. ............ 709/231 |

FOREIGN PATENT DOCUMENTS

| JP | H08-274888 A | 10/1996 |
| JP | 2004-032229 A | 1/2004 |
| JP | 2004-165946 A | 6/2004 |
| JP | 2005-267279 A | 9/2005 |
| WO | WO 2004/014054 A | 2/2004 |

* cited by examiner

Primary Examiner — Creighton Smith (57) ABSTRACT

Method of and arrangement for associating voice clips with a document, the document being reviewed by at least one participant during a telephone conference set up between a convener communication set (T5, C5) and one or more participant communication sets (T1-T4, C1-C4), where the voice clips contain spoken comments by the participants. The voice clips associated with locations in a section of the document synchronized in time such that each voice clip is associated with a certain location in the section and contains speech that was spoken by the participant at the 10 time that the image of the section was shown to the participant.

14 Claims, 9 Drawing Sheets

Total meeting duration: 90 minutes

—— Line is connected to conference bridge

P1394
See *FireWire*.

> Oct. 10, 2005 ; 10:15 AM
> Cas: " I remember ..........

P24T
See *Pentium*.

P5, P6
The Intel code names for the Pentium and Pentium Pro.

P68
The Intel code name for the successor to the Pentium Pro. It is expected to be an x86-only CPU rather than have x86 and HP PA-RISC capability as with the P7.

P7
The code name from Intel for the successor to the Pentium Pro and P68. It is expected in the 1996-1997 time frame with as many as 25 million transistors. Both Intel and HP are working on the chip, which is expected to be able to run x86 and PA-RISC applications simultaneously.

P75, P90, P100, etc.
Generally refers to Pentium CPUs or Pentium systems running at 75, 90, 100MHz, etc.

PABX
(Private Automatic Branch eXchange)  Same as *PBX*.

> Oct. 10, 2005 ; 10:19 AM
> Derek: " In the old days, ..........

PACBASE
Integrated CASE software for IBM, Bull HN and Unisys mainframes from CGI Systems, Pearl River, NY. It supports a wide variety of databases including DB2 and Oracle. PACLAN is the version for PCs running on LANs.

pack
(1) To compress data in order to save space. Unpack refers to decompressing data. See *data compression*.
(2) An instruction that converts a decimal number into a packed decimal format. Unpack converts a packed decimal number into decimal.
(3) In database programs, a command that removes records that have been marked for deletion.

packaged software
See *software package*.

> Oct. 10, 2005 ; 10:24 AM
> Carol: " We should add ..........

Packard Bell
(Packard Bell Electronics, Inc., Westlake Village, CA) A major PC manufacturer that pioneered sales into the mass-market retail chains in the late 1980s. As of 1994, it was the leading vendor in that market. Packard Bell is a privately-held company that distributes PCs to more than 11,000 retail outlets in the U.S. and 13,000 worldwide. It was also the first to offer toll-free support to retail end users.
The original Packard Bell was founded in 1926 as a consumer radio manufacturer and later entered the defense electronics industry. It was acquired by Teledyne in 1968. In 1986, Beny Alagem and a group of partners acquired the Packard Bell name from Teledyne and formed the company that exists today.

METHOD AND ARRANGEMENT FOR CAPTURING OF VOICE DURING A TELEPHONE CONFERENCE

FIELD OF THE INVENTION

The invention relates to the field of telephone conferences set up in a communication system.

BACKGROUND OF THE INVENTION

Telephone conferences may be set up in communication systems between two or more telephones of participants to the telephone conference. The set up of such telephone conferences may be done in several different ways. E.g., there may be a convener of the telephone conference who sets up the conference by operating suitable key combinations on his telephone. Alternatively, a telephone company may have a service to set up such a conference where the initiative is with an operator of the telephone company. As a further alternative, a telephone conference may be set up by allowing a number of participants of which the telephone numbers are known to call in at a certain telephone number while using an access code, after which the conference is starting automatically. Such known ways of setting up a telephone conference may also be used in the present invention.

During such a telephone conference, the participants and, if present, also the convener may be shown an image of a section of a document on a monitor or display, which document is to be reviewed by all participants. Comments made by the participant can be noted by, e.g., the convener or another participant and put into the document at a later moment in time.

SUMMARY OF THE INVENTION

It is an object of the present invention to improve the way comments made by participants regarding a document shown to the participants during a telephone conference are associated with the document.

To that end, the invention provides a communication system comprising a convener communication set for a convener of a telephone conference and at least one participant communication set, at least one processor connected to at least one database and at least one recorder arranged to receive and record speech from at least one participant to said telephone conference, the convener communication set comprising a convener telephone and a convener computer arrangement, each participant communication set comprising a participant telephone and a participant computer arrangement, the at least one processor being arranged to:

present an image of at least one section of a document to said convener computer arrangement and said participant computer arrangement;
  instruct said at least one recorder to record speech of said at least one participant and store recorded speech in said at least one database;
  transform said recorded speech into one or more voice clips, and
  associate these voice clips with locations in said at least one section synchronized in time such that each voice clip is associated with a certain location in said at least one section and contains speech that was spoken by said at least one participant at the time that the image of said section was shown to the at least one participant.

In an embodiment, the invention is directed to a processor system comprising at least one processor connected to at least one database and at least one recorder arranged to receive and record speech from at least one participant to a telephone conference set up between a convener communication set and at least one participant communication set, said convener communication set comprising a convener telephone and a convener computer arrangement, each participant communication set comprising a participant telephone and a participant computer arrangement, the at least one processor being arranged to:

present an image of at least one section of a document to said convener computer arrangement and said participant computer arrangement;
  instruct said at least one recorder to record speech of said at least one participant and store recorded speech in said at least one database;
  transform said recorded speech into one or more voice clips, and
  associate these voice clips with locations in said at least one section synchronized in time such that each voice clip is associated with a certain location in said at least one section and contains speech that was spoken by said at least one participant at the time that the image of said section was shown to the at least one participant.

In a further embodiment, the invention is directed to a method of associating voice clips with a document, the document being reviewed by at least one participant during a telephone conference set up between a convener communication set and at least one participant communication set, said convener communication set comprising a convener telephone and a convener computer arrangement, each participant communication set comprising a participant telephone and a participant computer arrangement, the method comprising:

presenting an image of at least one section of said document to said convener computer arrangement and said participant computer arrangement;
  recording speech of said at least one participant and storing recorded speech in at least one database;
  transforming said recorded speech into one or more voice clips, and
  associating these voice clips with locations in said at least one section synchronized in time such that each voice clip is associated with a certain location in said at least one section and contains speech that was spoken by said at least one participant at the time that the image of the section was shown to the at least one participant.

In a still further embodiment the invention is directed to a document produced by such a method.

In a still further embodiment the invention is directed to a computer program product comprising data and instructions arranged to provide a processor with the capacity to perform such a method.

Finally, in an embodiment, the invention is directed to a data carrier comprising such a computer program product.

An advantage of the present invention is that voice clips containing spoken comments made by the participants during the telephone conference are integrated in the document. Such voice clips may then be shown on a monitor together with an image of the document and can be played back. Such playing back can e.g. be done by putting a cursor on the voice clip on the monitor and, then, activating it by double clicking a mouse or the like.

BRIEF DESCRIPTION OF THE DRAWINGS

The invention will be explained in detail with reference to some drawings that are only intended to show embodiments of the invention and not to limit the scope. The scope of the invention is defined in the annexed claims and by its technical equivalents.

The drawings show:

FIG. 7 shows an example of a text document having voice clips added to it.

DETAILED DESCRIPTION OF EMBODIMENTS

Figure 1:
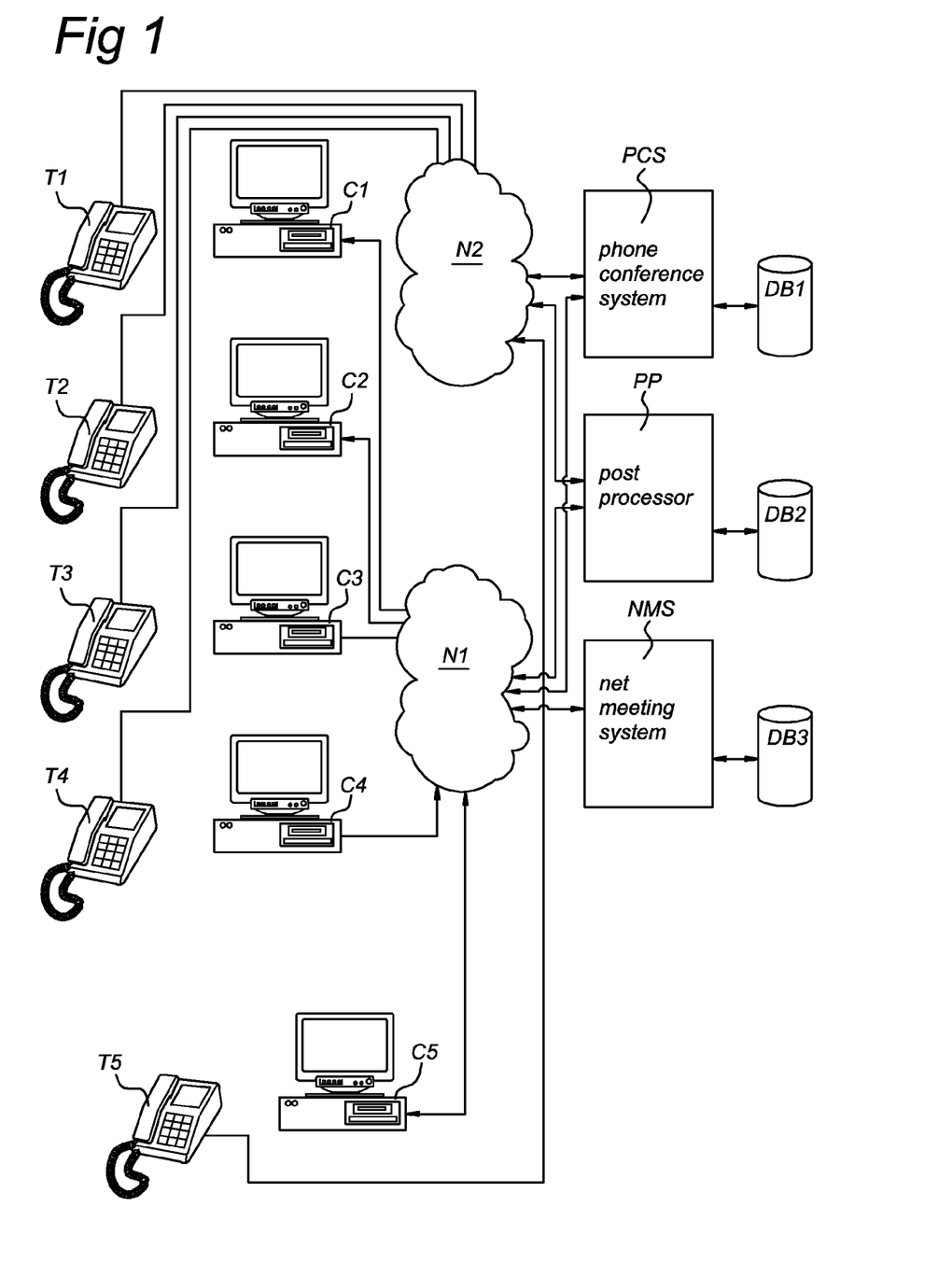
FIG. 1 shows a communication network that can be used in the present invention.

In FIG. 1, an overview is given of a communication system in which the present invention can be used. FIG. 1 shows a plurality of telephones T1, T2, T3, T4, which are connected to a communication network N2. It is observed that the number of telephones T1-T4 is shown to be equal to four but that is only intended as an example. Any arbitrary number of telephones may be used.

FIG. 1 also shows a number of computer arrangements C1, C2, C3, C4. Again, the number of computer arrangements shown is not intended to limit the invention. Any arbitrary number of computer arrangements may be used.

In general, there will be one communication set of a telephone and computer arrangement T1/C1, T2/C2, T3/C3, T4/C4 for each participant to a telephone conference. However, one such communication set may be used by two or more people at the same time.

It is observed that FIG. 1 shows non-mobile telephones T1-T4 with fixed lines to the communication network N2. However, as will be understood by a person skilled in the art, the telephones T1-T4 may be implemented as mobile telephones or, alternatively, as telephones with a wireless receiver. Moreover, any kind of local switch may be applied between the telephones T1-T4 and the communication network N2. In a further alternative, the telephones T1-T4 and the computer arrangements C1-C4 may be combined in one single apparatus. I.e., each participant may have one apparatus that has both the functionality of a telephone and of a computer arrangement.

The computer arrangements C1-C4 are shown as stand alone devices, e.g., personal desktop computers or personal laptop computers, however, they may be implemented as terminals connected to a server, or the like, where the server provides the main functionalities required.

As shown in FIG. 1, the computer arrangements C1-C4 are connected to a further communication network N1. The communication network N1 may be any communication network arranged to transmit digital signals, like the Internet. However, it is emphasized that, in an embodiment, the communication networks N1, N2 are one and the same communication network that is arranged to transmit both analog and digital signals. Moreover, the communication networks N1, N2 may be one single digital communication network arranged to transmit both the voice signals received from the telephones T1-T4 and the signals received from the computer arrangements C1-C4. Of course, then, the analog signals as received by the telephones T1-T4 from the participants should be converted from the analog to the digital domain before being transmitted via the digital communication network. Voice over IP (VoIP) is an example of how voice signals and digital data can be transmitted through one single digital communication network.

FIG. 1 also shows a communication set of a telephone T5 and a computer arrangement C5. The telephone T5 is connected to the communication network N2, whereas the computer arrangement C5 is connected to the communication network N1. For the communication set comprising the telephone T5 and the computer arrangement C5 the same remarks can be made as for the other combinations of telephones T1-T4 and computer arrangements C1-C4.

A phone conference system PCS, a post processor PP and a net meeting system NMS are also shown in FIG. 1. The phone conference system PCS is, in the embodiment of FIG. 1, connected both to the communication network N2 and the communication network N1. Also, the post processor PP is connected to both the communication network N2 and the communication network N1. The net meeting system NMS is shown to be connected to the communication network N1. The phone conference system PCS has a voice database DB1. The post processor has a post processor database DB2. The net meeting system NMS has a net meeting database DB3.

It is observed that the phone conference system PCS, the post processor PP and the net meeting system NMS may be partly or in whole implemented in one single server having only one single processor. Similarly, the databases DB1, DB2, DB3 may be implemented as a single database. FIG. 1 shows but one way of implementing the functionality of the present invention, as further explained hereinafter with reference to FIGS. 6A-6D.

Figure 2:
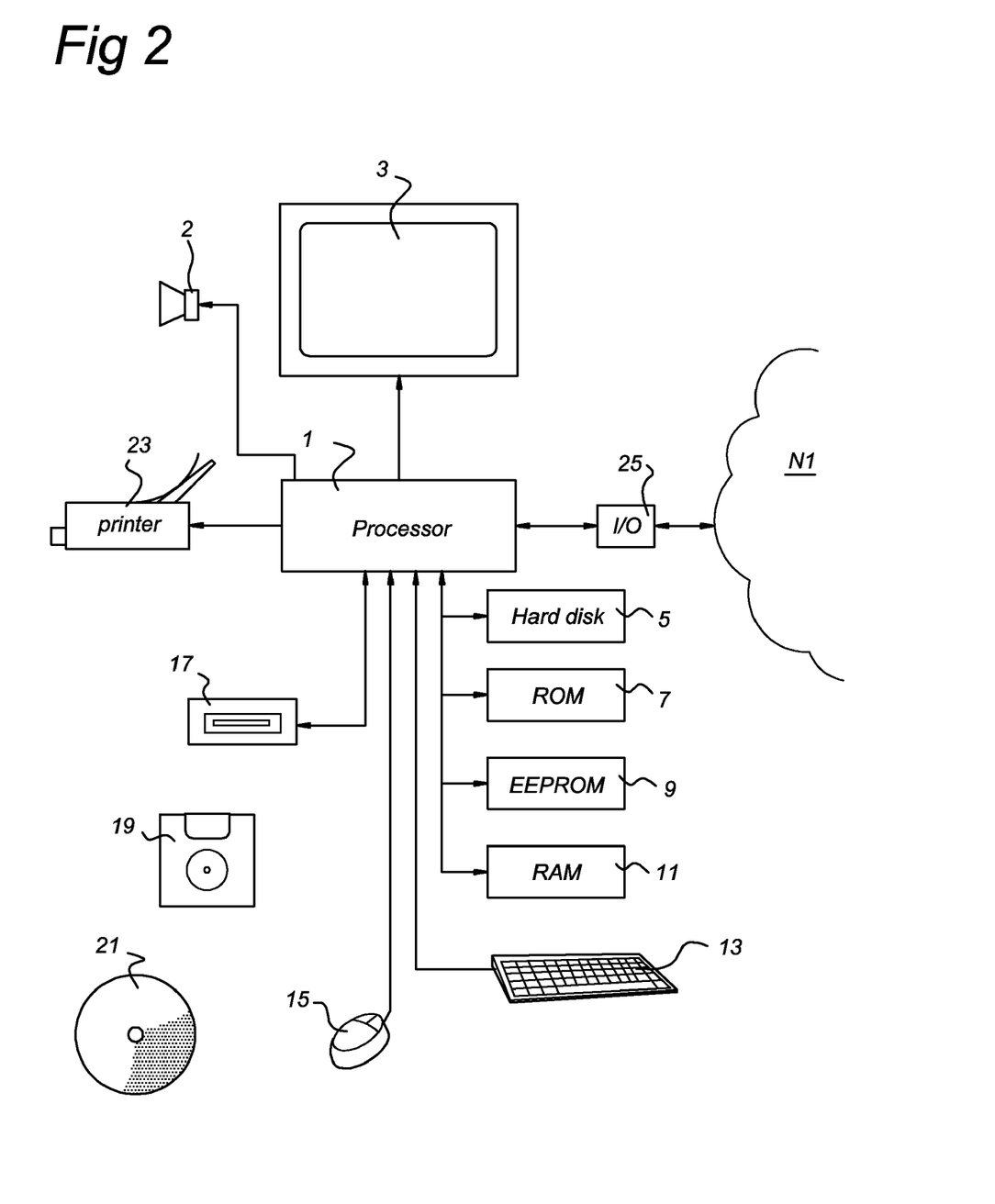
FIG. 2 shows a setup of a computer arrangement.

In FIG. 2, an overview is given of a computer arrangement that can be used to implement any of the computer arrangements C1-C5. The computer arrangement comprises a processor 1 for carrying out arithmetic operations. The processor 1 is connected to a plurality of memory components, including a hard disk 5, Read Only Memory (ROM) 7, Electrically Erasable Programmable Read Only Memory (EEPROM) 9, and Random Access Memory (RAM) 11. Not all of these memory types need necessarily be provided. Moreover, these memory components need not be located physically close to the processor 1 but may be located remote from the processor 1.

The processor 1 is also connected to means for inputting instructions, data etc. by a user, like a keyboard 13, and a mouse 15. Other input means, such as a touch screen, a track ball and/or a voice converter, known to persons skilled in the art may be provided too.

A reading unit 17 connected to the processor 1 is provided. The reading unit 17 is arranged to read data from and possibly write data on a data carrier like a floppy disk 19 or a CD-ROM 21. Other data carriers may be tapes, DVD, etc. as is known to persons skilled in the art.

The processor 1 is also connected to a printer 23 for printing output data on paper, as well as to a display 3, for instance, a monitor or LCD (Liquid Crystal Display) screen, or any other type of display known to persons skilled in the art.

The processor 1 is connected to communication network N1 by means of I/O (input/output) means 25. The processor 1 may be arranged to communicate with other communication arrangements through communication network N1.

The processor 1 may be implemented as stand alone system, or as a plurality of parallel operating processors each arranged to carry out subtasks of a larger computer program, or as one or more main processors with several sub processors. Parts of the functionality of the invention may even be carried out by remote processors communicating with processor 1 through the communication network N1.

It is observed that the setup of the computer arrangement shown in FIG. 2 may, essentially, also be used to implement the phone conference system PCS, the post processor PP and the net meeting system NMS. However, it is also observed that the phone conference system PCS, the post processor PP and the net meeting system NMS need not necessarily comprise all of the components shown in FIG. 2. It is only essential that they have some kind of processor and some kind of memory where the memory stores instructions and data, such that the processor can perform its task in accordance with the present invention. These tasks will be explained in detail hereinafter.

Figure 3:
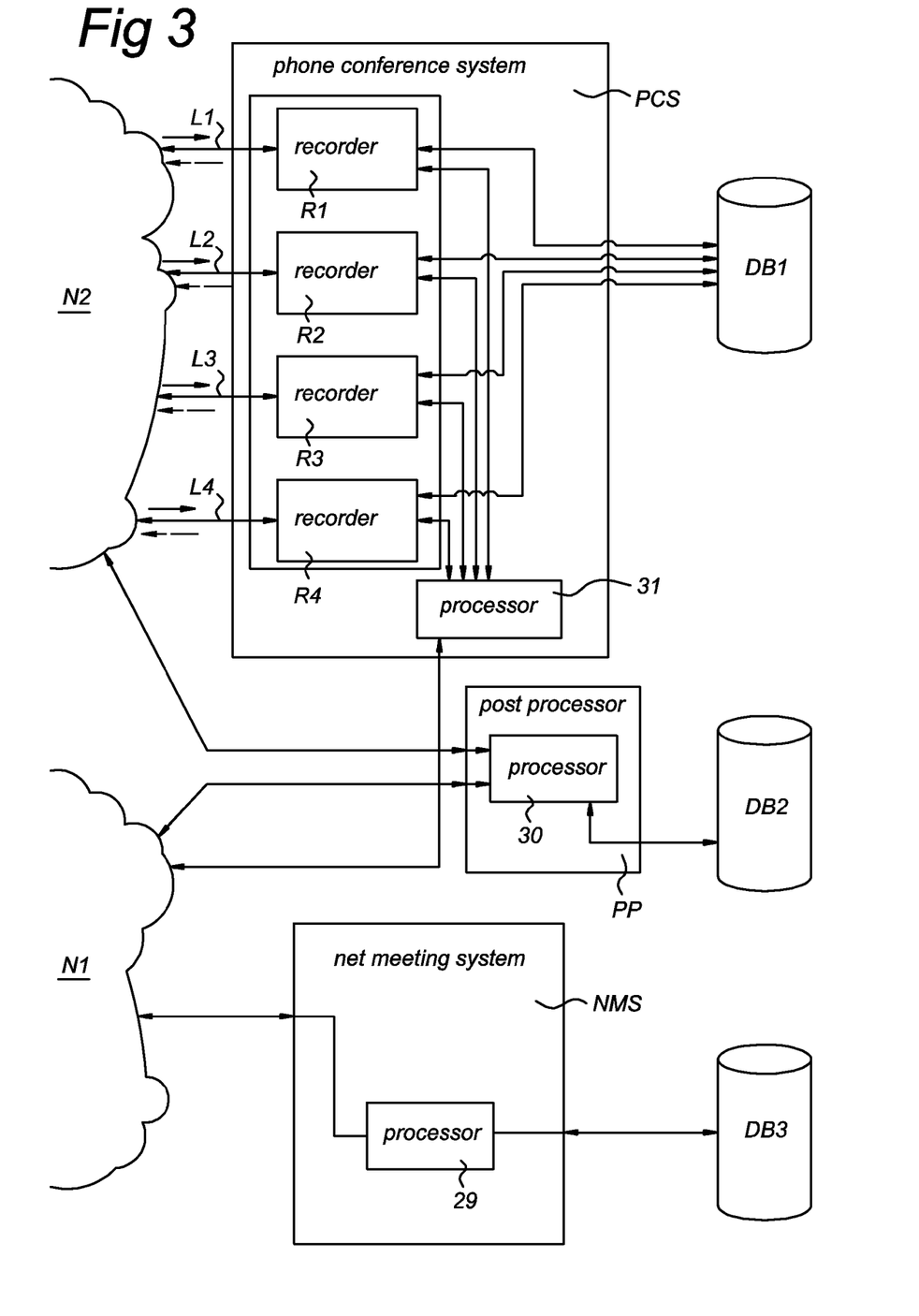
FIG. 3 shows some functional details of a phone conference system, a post processor and a net meeting system that can be used in the present invention.

However, before explaining these tasks in detail, first of all reference is made to FIG. 3. FIG. 3 shows examples of the phone conference system PCS, the post processor PP and the net meeting system NMS.

As shown, the phone conference system PCS may comprise a plurality of recorders R1, R2, R3, R4. Again, the number of recorders shown (i.e., four) is not intended to limit the present invention. This number is shown only by way of example. Each of the recorders R1-R4 is shown to be connected to a line L1, L2, L3, L4, which is connected to the communication network N2. These lines L1-L4 may be implemented as four separate physical lines. However, as persons skilled in the art will know, there may be just one physical line arranged to transport a plurality of signals, one signal per recorder R1-R4, e.g., in the form of any known multiplexing technique. In the same way, the recorders R1-R4 can be implemented as one single recorder arranged to receive such multiplexed speech signals and to demultiplex them before recording.

The lines L1-L4 need not be physical lines: they may be implemented as one or more wireless connections. This statement also holds for any other communication connection shown in any of the figures.

Each one of the recorders R1-R4 is connected to a phone conference processor 31. The phone conference processor 31 is arranged to perform the task of a computer program as instructed by instructions and data stored in a memory (not shown).

The recorders R1-R4 are also connected to the voice database DB1.

Together, the recorders R1-R4 may be located before a conference bridge. A conference bridge is established in an exchange of a telephone network for the duration of a telephone conference and is known from the prior art. Such conference bridges can be easily implemented in circuit switched networks. Logging in to such a conference bridge may be done by calling a predetermined telephone number followed by an identification code that identifies that conference bridge. Implementing recorders R1-R4 before such a conference bridge may use techniques as used when tapping telephone lines, e.g. for lawful interceptions. Requirements specifications and implementations for lawful interception may be found in: for GSM: 3GPP standard TS 41.033, 42.033 and 43.033, and for UMTS: 3GPP standard TS 33.106 and 33.107.

FIG. 3 shows that the post processor PP comprises a processor 30. This processor 30 is arranged to perform specific tasks as instructed by a computer program that is stored in the form of instructions and data in a memory (not shown in FIG. 3).

FIG. 3 shows that the net meeting system NMS comprises a net meeting processor 29. This net meeting processor 29 is arranged to perform specific tasks as instructed by a computer program that is stored in the form of instructions and data in a memory (not shown in FIG. 3). The processors 29, 30 and 31 are arranged to communicate with one another via the communication network N1. Of course, other arrangements for communicating between the processors 29, 30 and 31 can be made without departing from the scope of the present invention.

The setup of the system shown in FIGS. 1, 2 and 3 is advantageously be used for telephone conferences. During such a telephone conference one or more participants use a communication set of one telephone T1-T4 and one computer arrangement C1-C4. These participants may be located within one and the same building. However, the participants may also be located a long distance away from one another.

In accordance with the present invention, the system is used to review one document with a plurality of participants and store comments in the form of voice contributions of the different participants as to the content of the document, e.g., in voice database DB1.

It is assumed that there is one convener of the telephone conference who is operating the communication set of the telephone T5 and the computer arrangement C5. Of course, the convener may be a participant to the telephone conference himself. Thus, the term "convener" is only used to identify a specific role to be played by one of the participants. By operating the input devices of his computer arrangement, like a keyboard or a mouse, the convener arranges for images of (sections of) the document to be shown on any of the monitors of the computer arrangements C1-C4. The convener decides which section of the document is shown on the monitors of the computer arrangements C1-C5 at which moment in time.

In general terms, the concept of the present invention is as follows.

The participants review the document as shown on their monitors section by section. At the same time that the participants are viewing these sections of the document on their respective monitors, their telephones T1-T4 have established a voice connection with the phone conference system PCS. This connection to the phone conference system PCS during a telephone conference may be made by any method known in the art. For instance, many telephone companies offer the option of setting up such a telephone conference by an operator of the telephone company. Alternatively, the convener may use his telephone T5 to set up a telephone conference in a way known from the art.

In a preferred embodiment, the participants are registered beforehand with their respective telephone numbers such that the system stores their Calling Line Identification (CLI), e.g., in database DB1. The CLI is used to link each participant with a telephone line.

To each section of the document shown on the monitors of the computer arrangements C1-C5, the participants of the meeting may provide comments. Each participant's comment on a particular section is captured in audio format and is stored such that it can be added to the document as an audio component (e.g., as a voice clip or audio object). The audio component is placed in the document as an audio comment to a particular section, paragraph, figure, etc.

In an embodiment, the meeting convener decides when a particular participant's speech should be captured and embedded in the document. Hence, whenever one of the meeting participants is "given the floor" (i.e., starts talking), in this embodiment, the convener activates the voice capture mode. When the convener wants to capture voice of certain participant associated with line L1, then his computer arrangement C5 translates that into an instruction towards phone conference system PCS to record voice received on line L1.

Figure 4:
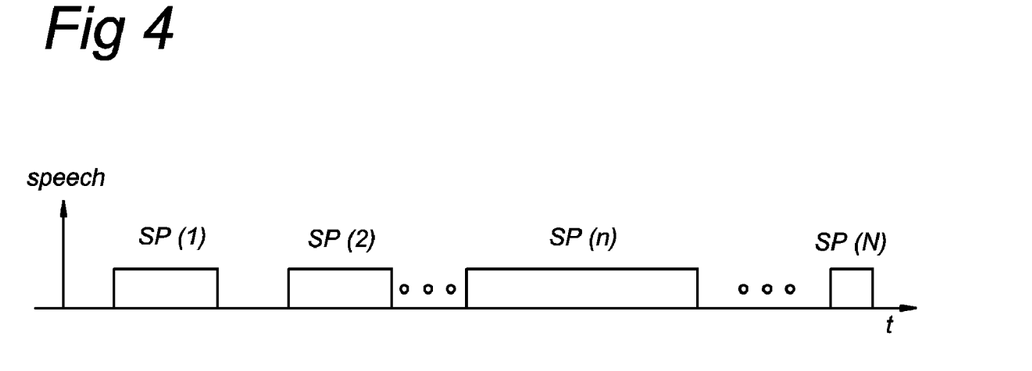
FIG. 4 shows a timing diagram of recording of speech.

The phone conference system PCS receives the speech from all participants. FIG. 4 shows an example of a speech contribution of one of the participants. FIG. 4 shows the speech contribution of one of the participants as a function of time t in the form of a plurality of speech blocks SB(1), SB(2), SB(n), . . . SB(N). So, the speech of the participant shown in FIG. 4 is characterized by silent periods between speech blocks SB(n). The phone conference system PCS receives these speech blocks SB(n) and stores them in the voice database DB1. In order to allow the proper association between the stored voice blocks SB(n) and the document, each of the voice blocks SB(n) may be stored together with a time stamp, as well as an identification of the participant. This time stamp is synchronized with the time where the cursor was located in the section of the document as shown to all participants on their respective monitors. Instead of a cursor, any other kind of identification of the section shown on the monitors may be used. In an embodiment, that identification of the section shown is included in the speech files as stored in the voice database DB1. Thus, each speech file of any of the participants contains the speech of the participant, the time stamp and the section identification. In an embodiment, after the meeting, the speech files may be embedded in the document by the post processor PP. The post processor PP can produce a "presence graph". The post processor PP then uses the pre-registered information (participant name and CLI) to add a name to the presence graphs. The post processor PP uses the output produced by the phone conference system PCS to produce the graphs. It uses the names to give meaning to the graph. When generating the marked-up document, the post processor PP also needs the names to put these in "text balloons" in the document.

Now, a detailed description of the functionality of the phone conference system PCS, the post processor PP and the net meeting systems NMS will be given for four different embodiments.

In a first embodiment that will be explained with reference to FIG. 6A, the convener who is operating the telephone T5 and the computer arrangement C5 is in full control over the voice capturing process.

In the second embodiment the convener is still in full control of the voice capturing process. However, in this embodiment the functionality of the post processor PP is implemented in the net meeting system NMS.

In the third embodiment, the convener is not in full control anymore of the voice capturing process. The voice capturing is performed more or less fully automatically, as will be explained with reference to FIG. 6C. In the fourth embodiment, that is explained with reference to FIG. 6D, again, the voice capturing process is done more or less automatically. Moreover, the functionality of the post processor PP is implemented in the net meeting system NMS.

Embodiment 1

In this first embodiment, the convener is operating the communication set comprising the telephone T5 and the computer arrangement C5. The convener is in full control of the document review process. The convener determines the section in the document that is to be reviewed by all of the participants. The participants have access to the system by means of the plurality of communication sets comprising a telephone T1-T4 and a computer arrangement C1-C4.

Figure 6A:
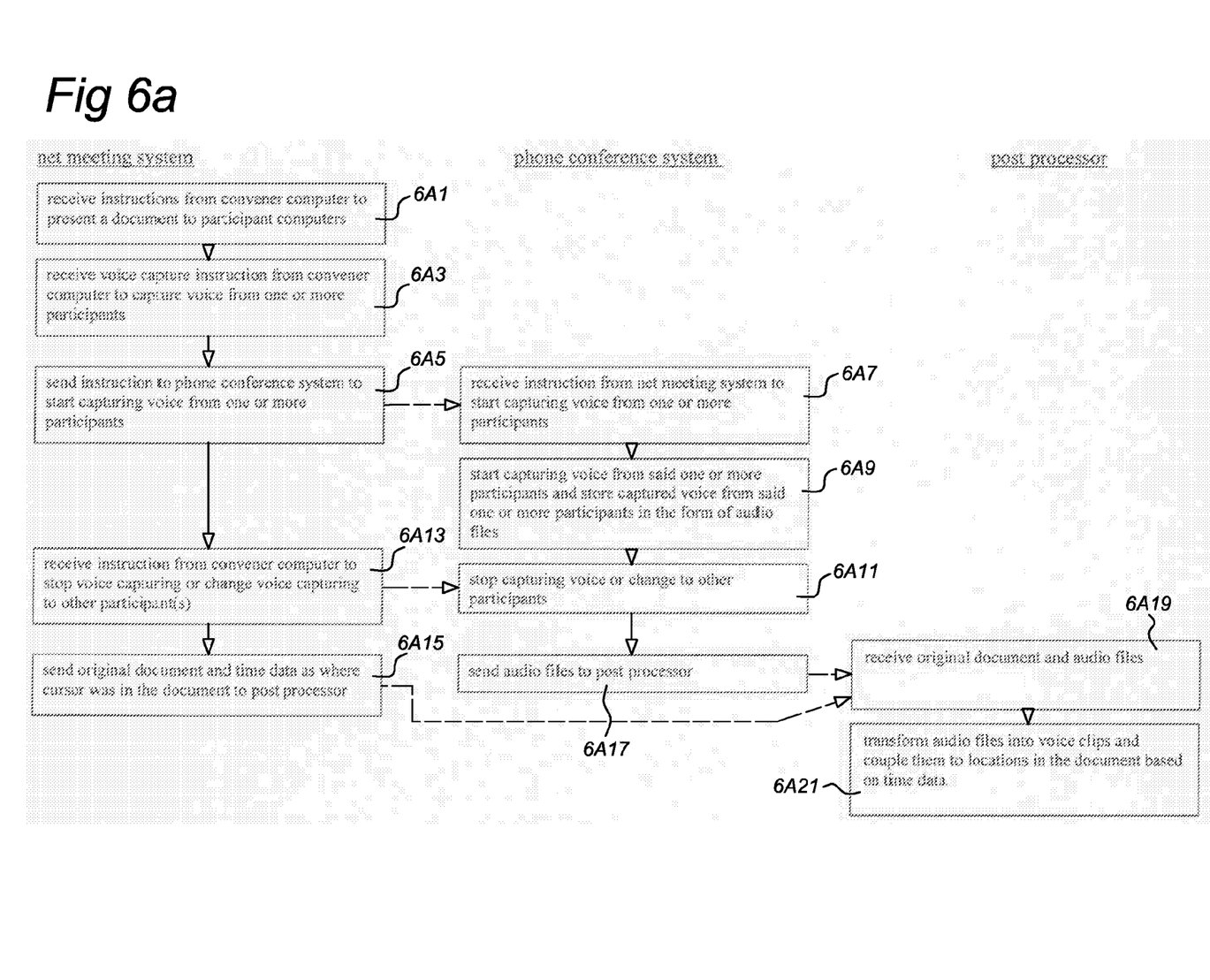
FIGS. 6A-6B show flow charts of the functionality of the communication system shown in FIG. 1 in several different embodiments.

As shown in FIG. 6A, a first action 6A1 is that the net meeting system NMS receives instructions from the computer arrangement C5 of the convener to present an image of the document to the computer arrangements C1-C4 of the participants. This will be done by showing such an image of the document on the monitors of the computer arrangements C1-C4. The convener, by means of his computer arrangement C5, is in control of which section of the document is shown to the participants on their respective monitors. The convener also decides about the position of the cursor in the document.

All participants and the convener may speak to one another by means of their telephones T1-T5. E.g., the convener invites one of the participants to provide a comment to the section of the document as shown on the monitor. The net meeting system NMS provides the convener with a menu on his monitor (e.g. in the form of selection buttons that should be clicked or double-clicked by a mouse), which allows the convener to select one or more voice contributions of one or more of the participants to be captured by the phone conference system PCS. To that end, the net meeting system NMS receives a voice capturing instruction from the computer arrangement C5 of the convener for one or more participants, as shown in action 6A3. In action 6A5, the net meeting system NMS sends an instruction to the phone conference system PCS to start capturing the voice of one or more of the participants. Such an instruction comprises one or more of the following information:

- the identity of the telephone T1-T4 from which the voice should be captured. For this purpose, the calling line identification (CLI) could be used. This will be used by the phone conference system PCS to capture the appropriate participant's voice.
- the current location of the cursor in the document as shown on the monitors of the computer arrangements C1-C5. This will be used by the post processor PP, at a later moment in time, to combine the captured voice with the appropriate location in the document.
- the time of capturing the voice: this can be used by the post processor PP to allow an indication of the moment in time that comments were made to be read from the system.
- the name of the participant whose voice should be captured. This can be used by the post processor PP, so that, after a post processing action, the name of the person whose voice is captured can be placed in the document, together with the comment given. It is observed that providing the name of a participant is not strictly necessary. Sometimes, one can rely on the CLI to derive the name of the participant. The post-processing system can add the name, when generating the marked-up document. However, if one phone connection is shared by two or more persons (e.g. loudspeaker phone), then it may indeed be needed to provide the name of the speaker, as the CLI will in that case not be enough.

In action 6A7, the phone conference system PCS receives this instruction from the net meeting system NMS to start capturing the voice from one or more of the participants.

After having received that instruction, in action 6A9, the phone conference system PCS starts capturing the voice from the identified one or more participants and stores the captured voice from the one or more participants in the form of audio files in the voice database DB1.

At a certain moment in time, the convener decides to stop the telephone conference or to change the voice capturing from one or more of the participants to one or more other participants. In action 6A13, the net meeting system NMS receives an instruction to that effect from the computer arrangement C5 of the convener. The net meeting system NMS converts such an instruction to an instruction for the phone conference system PCS to stop capturing the voice entirely or to change to one or more other participants. This instruction is received, in action 6A11, by the phone conference system PCS. After having received that instruction, the phone conference system PCS stops capturing the voice entirely or changes to voice capturing of other participants.

After having stopped the voice capturing entirely, the phone conference system PCS reads the stored audio files from the voice database DB1 and sends them to the post processor PP, as indicated in action 6A17.

After the telephone conference has been ended, the net meeting system NMS sends the original document to the post processor PP. Together with the document, the net meeting system NMS sends time data as to at which location the cursor was in the document as a function of time to the post processor PP. This is indicated in action 6A15.

Action 6A19 indicates that the post processor PP receives the original document from the net meeting system NMS and the audio files from the phone conference system PCS.

After having received the original document and the audio files, the post processor PP transforms the audio files into voice clips and associates them with locations in the document to render a processed document. This is done in action 6A21. In action 6A21, it is indicated that this association is based on the time data indicating where the cursor was in the document at which moment in time and when the respective audio files were captured by the phone conference system PCS. The post processor PP stores the document, together with the audio files associated therewith in the post processor database DB2. Of course, a copy of that processed document can be sent back to the computer arrangement C5 of the convener. However, it can also remain in the post processor database DB2 only. As a further alternative, it can be stored in any other memory.

Instead of using the time data as indicated in action 6A21, the post processor PP can also use other information to associate the audio files to the correct location in the original document, e.g., the information as to the place where the cursor was located in the document at the time that the voice capturing process started as instructed by the convener.

Preferably, arrangements may be made for the participants to get access to the processed document as stored in the post processor database DB2.

Embodiment 2

Figure 6B:
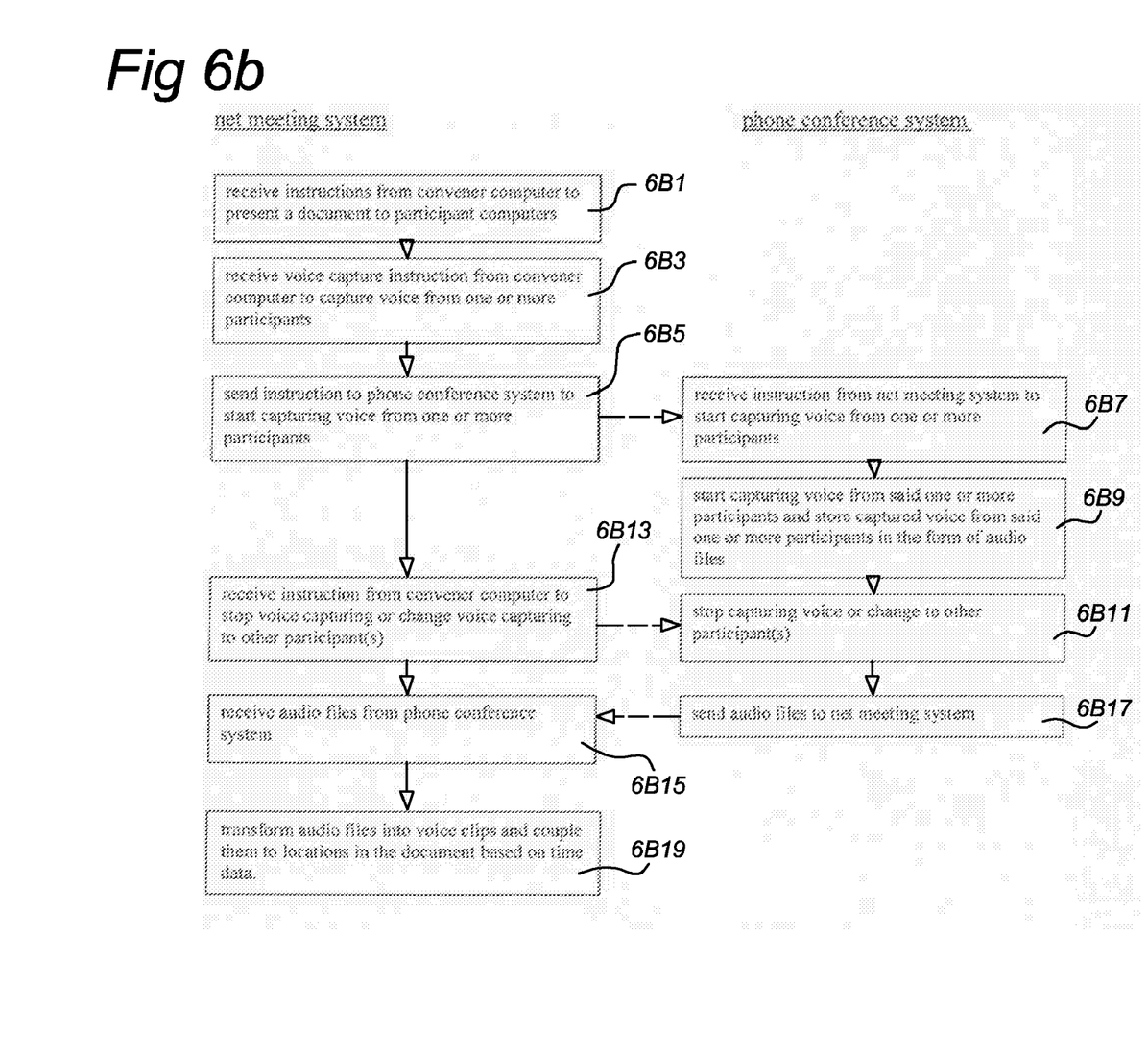

In the second embodiment, the convener is still in full control of the document review process. However, in the second embodiment, the post processor PP is not used. FIG. 6B shows a flow chart that illustrates the second embodiment.

The actions 6B1, 6B3 and 6B5, respectively, are the same as the actions 6A1, 6A3 and 6A5, respectively.

The actions 6B7, 6B9, and 6B11, respectively, are the same as the actions 6A7, 6A9 and 6A11, respectively.

Action 6B13 is the same as action 6A13.

The actions from FIG. 6B that are equal to actions in FIG. 6A are not explained again.

Action 6B17 differs from action 6A17 in the sense that the phone conference system PCS does not send the audio files as captured and stored in the voice database DB1 to the post processor PP but to the net meeting system NMS. In action 6B15, the net meeting system NMS receives the audio files from the phone conference system PCS.

After having received these audio files from the phone conference system PCS, the net meeting system NMS transforms the received audio files into audio clips and associates them with locations in the document based on the time data, as shown in action 6B19. Action 6B19 is equal to action 6A21 be it that this action is now performed by the net meeting system NMS instead of by the post processor PP. Action 6B19 will, thus, not be explained in detail again, but it should be understood that it comprises alternatives as explained with reference to action 6A21. After the transformation, the net meeting system NMS produces a processed document in which voice clips are added to the original document. This processed document is stored in the net meeting system database DB3 (or any other database).

In an embodiment of FIG. 6B, the phone conference system PCS may be programmed to send an audio file to the net meeting system NMS, each time that the phone conference system PCS has recorded a speech block as shown in FIG. 4. Then, the net meeting system NMS is programmed to associate the received speech block as a voice clip with the location where the cursor is in the document at the time of receiving the speech block. This has the advantage that, while the voice of the participant is captured by the phone conference system PCS, the convener may edit the document without running the risk that the post processor PP is no longer able to tie the voice clip to a particular place in the document, due to the fact that the document as been modified during the meeting.

Embodiment 3

As an enhancement to the method described above, the following method may be considered. This is explained with reference to the embodiments 3 and 4. In the embodiments 3 and 4, instead of having the convener (or one of the participants) control when a participant's speech shall be captured by the phone conference system PCS, automatic voice recognition may be applied for starting the voice capturing process. This may be implemented by the embodiment shown in FIG. 3, where the recorders R1-R4 are, then, arranged to automatically detect voice on the respective input lines L1-L4. Then, the respective recorder R1-R4 will automatically start recording when it detects human speech. In this way, neither the convener, nor any of the participants needs to be concerned about the voice capturing process. This is done fully automatically, whenever one or more of the participants speak. For such speech detection, existing technology may be used. Speech detection is, e.g., used in GSM TDMA Radio Access Network, for the purpose of Discontinues Transmission (DTX). Reference is made to the following standards: 3 GPP TS 46.031 and 3GPP TS 46.032. However, other known (or still to be developed) speech detection mechanisms may be used within the scope of the present invention.

The recorders R1-R4 may send their respective outputs via individual lines to the voice database DB1, where the captured voices are stored independently from one another. However, alternatively, the voices recorded by the recorders R1-R4 on the same time may be stored as a combined audio file in the voice database DB1. However, if this is done, it may be difficult to distinguish between the different contributions of the different participants at a certain moment in time.

Adjacent to each one of the lines L1-L4, there is shown an arrow with a solid line. These arrows with solid lines refer to the participant's speech that is transferred to the respective recorder R1-R4. Moreover, adjacent to each one of the lines L1-L4, there is shown an arrow with interrupted line. The arrows with an interrupted line refer to all speech of all participants, excluding the speech of the participant connected to the line concerned, that is fed back to the receiver of the respective telephones T1-T5.

Figure 6C:
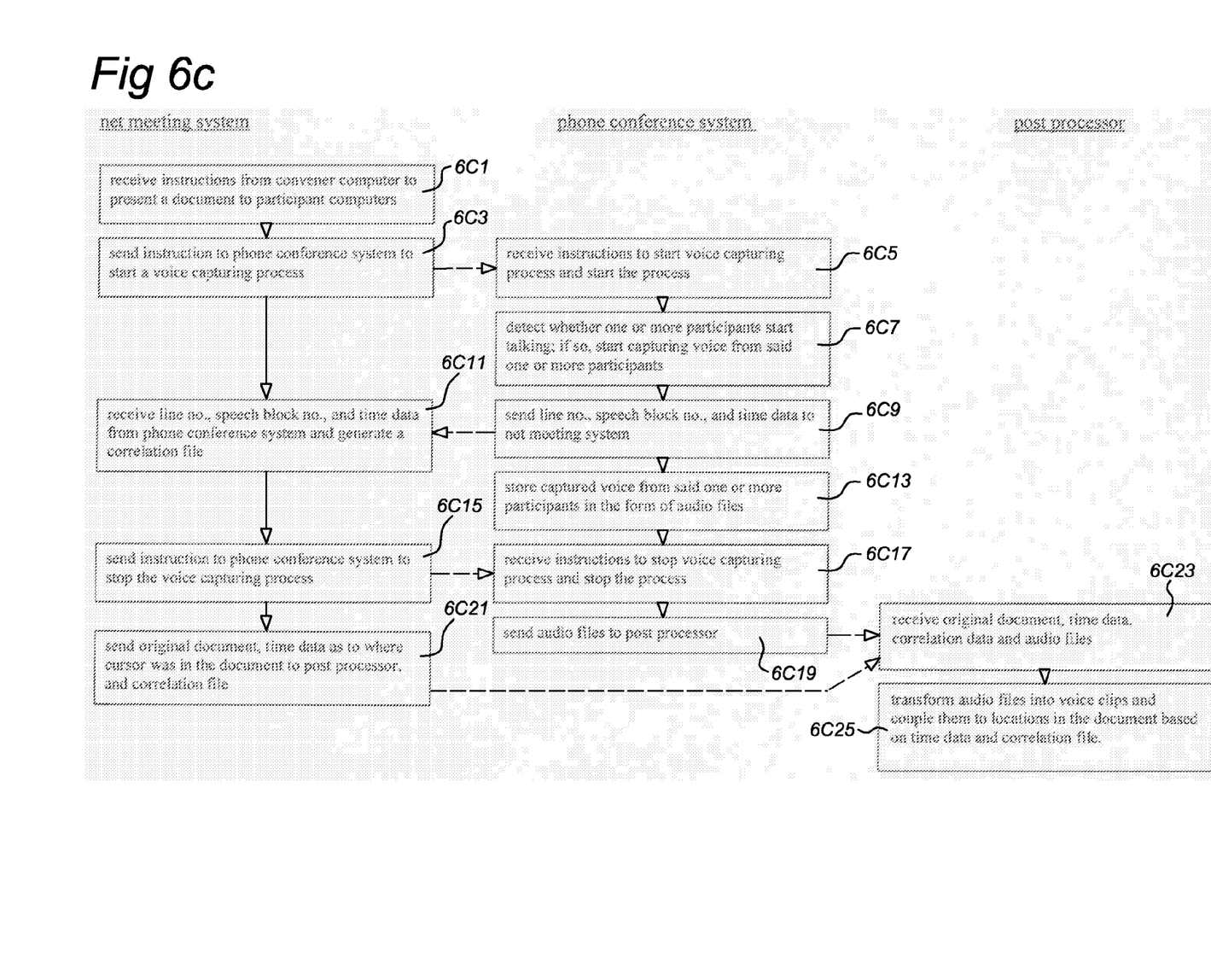

FIG. 6C shows the functions of the different systems in this third embodiment.

In action 6C1, the net meeting system NMS receives instructions from the computer arrangement C5 of the convener to present an image of a document to the computer arrangements C1-C4 of the participants. Moreover, this document will be shown on the monitor of the computer arrangement C5 of the convener.

After that, the net meeting system NMS, as shown in action 6C3, will send an instruction to the phone conference system PCS to start an automatic voice capturing process.

Action 6C5 shows that the phone conference system PCS receives the instruction to start the voice capturing process and starts that process.

In action 6C7, the phone conference system PCS detects whether one or more participants start talking. This is done by the recorders R1-R4, as explained above. If one or more of the recorders R1-R4 detect the presence of voice on the respective input line L1-L4, the recorder R1-R4 starts the voice capturing. The captured voice from the one or more participants is stored by the phone conference system PCS in the voice database DB1 in the form of audio files.

The voice as detected and stored will typically have the form as shown in FIG. 4. I.e., the registered voice will be stored in the form of speech blocks SB(n) as a function of time. The phone conference system PCS (i.e., the phone conference processor 31) informs the net meeting system NMS that voice capturing for one or more lines L1-L4 has started. To that end the phone conference system PCS sends the following information to the net meeting system NMS:
  the line numbers of the lines L1-L4 from which speech is recorded;
  the number n of the speech block SP(n) concerned;
  starting time of the recording.
This is indicated with reference to 6C9 in FIG. 6C.

In action 6C11, the net meeting system NMS receives this information, i.e., the line number, the speech block number and the time data, from the phone conference system PCS. The net meeting system NMS uses this information to generate a so-called "correlation file". This correlation file contains this information, as well as an indication of the location of the cursor in the document under review at the time that the voice capturing was generated. This correlation file is stored in the net meeting system database DB3.

In action 6C13, the phone conference system PCS stores the captured voice from the one or more participants in the form of audio files in the voice database DB1.

In action 6C15, the net meeting system NMS, as instructed by the convener of the telephone conference, sends an instruction to the phone conference system PCS to stop the voice capturing process.

In action 6C17, the phone conference system PCS receives the instructions to stop the voice capturing process and stops the process.

In action 6C19, the phone conference system PCS sends the audio files as registered in the voice database DB1 to the post processor PP.

In action 6C21, the net meeting system NMS sends the original document, the time data as to where the cursor was in the document at which moment in time to post processor PP, as well as the correlation file generated in action 6C11.

In action 6C23, the post processor PP receives the audio files from the phone conference system PCS, as well as the original document, the time data and the correlation file from the net meeting system NMS.

In action 6C25, finally, the post processor PP transforms the audio files into voice clips and associated them with appropriate locations in the document based on the time data and the correlation file. The result is a post processed document that is stored in the post processor database DB2. The post processed document may be sent to, e.g., the computer arrangement C5 of the convener, or to any of the other computer arrangements C1-C4. Alternatively, or in addition to that, any of the participants and/or the convener may have access to the post processed document as stored in the post processor database DB2.

Embodiment 4

The fourth embodiment of the present invention is explained with reference to FIG. 6D. Like in the setup of the embodiment of FIG. 6C, the convener does not have full control over the capturing process. Moreover, in the embodiment of FIG. 6D, the post processor PP has no function. The functionality of the post processor PP as shown in the embodiment of FIG. 6C is taken care of by the net meeting system NMS.

The actions 6D1, 6D3, 6D11 and 6D15, respectively, are the same as the action 6C1, 6C3, 6C11 and 6C15, respectively, as explained with reference to FIG. 6C.

Moreover, the actions 6D5, 6D7, 6D9, 6D13 and 6D17, respectively, are the same as the action 6C5, 6C7, 6C9, 6C13 and 6C17, respectively, of the embodiment according to FIG. 6C.

Action 6D19 differs from action 6C19, in the sense that the audio files as stored in the voice database DB1 are not sent to the post processor PP, but to the net meeting system NMS. In action 6D21, the net meeting system NMS receives these audio files from the phone conference system PCS.

In action 6D23, the net meeting system transforms these received audio files into voice clips and associated these voice clips with the appropriate locations in the document based on time data and the correlation file. This results is a processed document that is stored in the net meeting system database DB3. This processed document may be accessible to the convener and the other participants via the computer arrangements C1-C5 via one or more of the communication networks N1, N2.

Figure 6D:
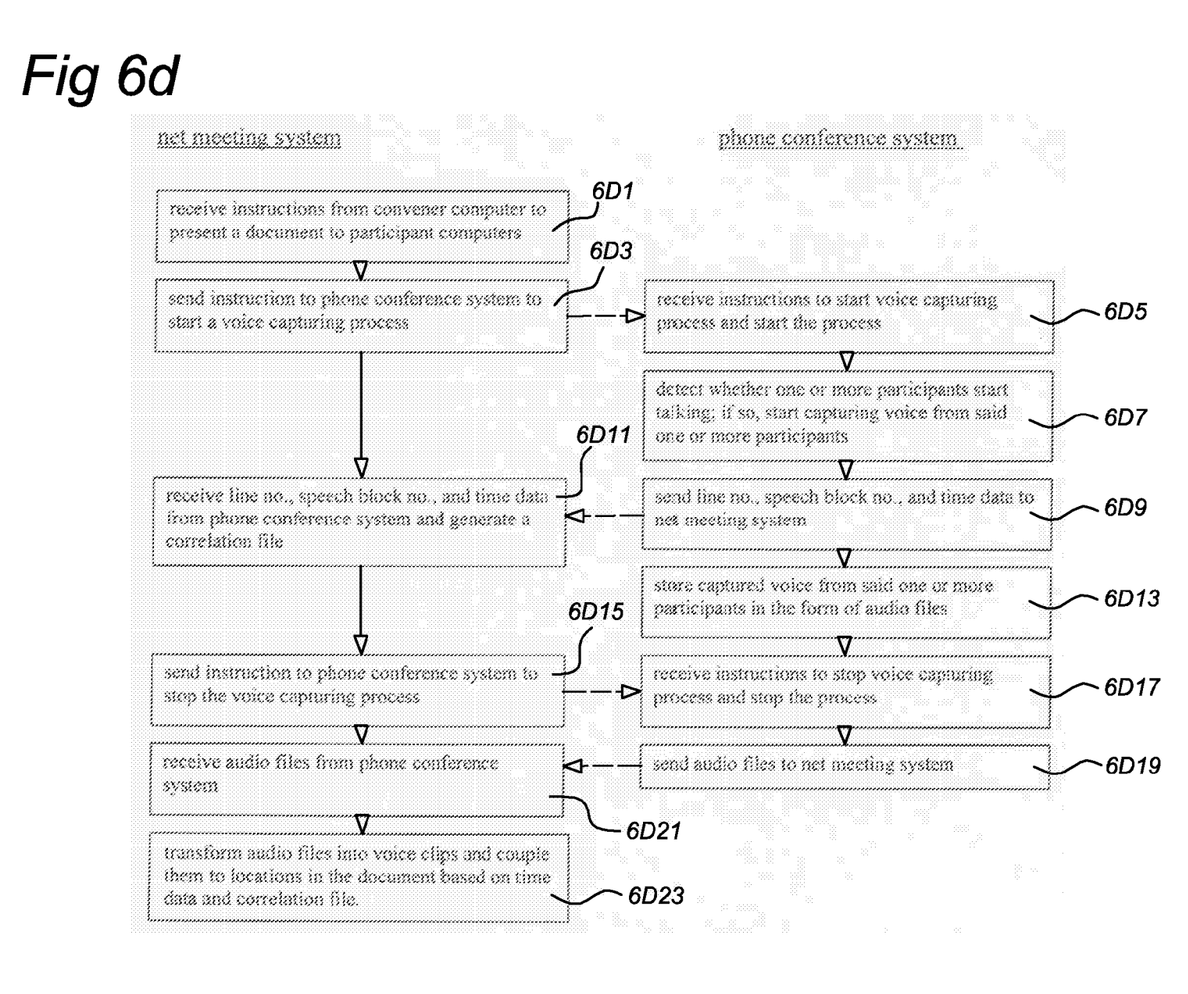

The advantages of the embodiment according to FIG. 6D are similar to the advantages of the second embodiment, as explained with reference to FIG. 6B. These advantages will not be repeated here.

As in the embodiment according to FIG. 6B, the phone conference system PCS does not need to postpone sending audio files to the net meeting system NMS until the telephone conference has completely ended. Contrary to that, it may be advantageous to send each speech block SB(n) or some of the speech blocks together, to the net meeting system NMS before the telephone conference has ended. That provides the net meeting system NMS with the option to associate the audio files, in the form of a voice clip, with the appropriate locations in the document at the time the cursor is still at the appropriate location in the document. This allows for changes to be made in the document by, e.g., the convener at the time of the telephone conference.

Output

After the telephone conference, a processed document will be available comprising the original text (and/or other information in the document) and audio information in the form of voice clips. An example of a section of such a document is shown in FIG. 7, where the voice clips are shown in the form of so-called call-outs. Besides the actual voice components, these call-outs may comprise an indication of the time a comment was made by one of the participants, the name of the participant who made the comment, etc. When such a section of a document is shown on a monitor of one of the computer arrangements C1-C5 the user of such computer arrangement C1-C5 is able to listen to the voice clip, e.g., by clicking or double-clicking with, e.g., his mouse when the cursor is located on such a call-out. After such clicking or double-clicking (or any other suitable action), the processor 1 of the computer arrangement will play back the content of the voice clip via the loudspeaker 2 (cf. FIG. 2).

The content of such a call-out may relate to the voice captured from one of the participants only. However, the content of such a call-out may also relate to a plurality of participants, as explained above. As a further alternative, a user of one of the computer arrangements C1-C5, may be provided with the option to select one or more of the voice clips of one or more of the participants, excluding his own voice clips.

In a further alternative, the users of the computer arrangements C1-C5 may be presented with the option to play back all contributions of all participants and the convener during a time span to be specified by the user.

Presenting these options to the users of the computer arrangements C1-C5 may be controlled by the post processor PP (embodiments according to FIGS. 6A and 6C) or the net meeting system NMS (embodiments of FIGS. 6C and 6D).

Figure 5:
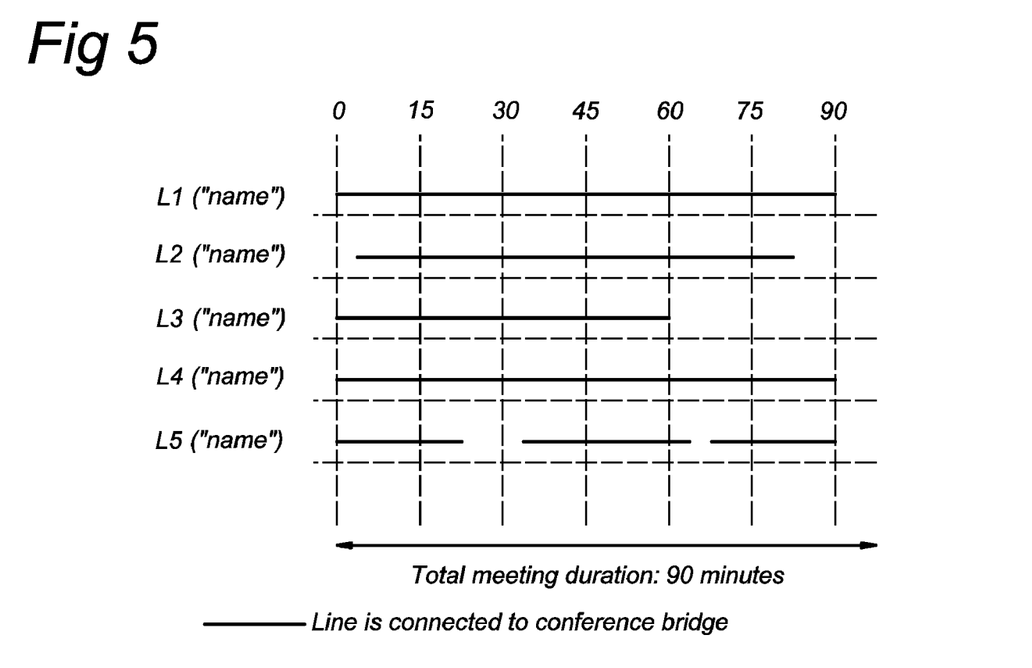
FIG. 5 shows a diagram of voice capturing of a plurality of participants.

A further output of the system as explained above may be a graphical presentation of the attendance of the participants to the meeting. Such a graphical presentation as shown by way of example in FIG. 5. FIG. 5 shows that several lines L1-L5 were connected to the phone conference system PCS during the telephone conference. It is observed, that FIG. 5 shows five lines whereas, in FIG. 3 there were shown four lines. The fifth line L5 may, e.g., be the line connected to the telephone T5 of the convener whose voice contributions can also be captured.

FIG. 5 does not show so much when the participants or the convener have been speaking but shows when there was a live connection between the phone conference system PCS and the respective telephones T1-T5. This is indicated with a solid line in FIG. 5. The time span chosen is ninety minutes in FIG. 5. However, any other example may be used instead. The diagram shown in FIG. 5 is, in one embodiment, produced by the phone conference system PCS, which stores data to that effect in a memory, which may be a portion of the voice database DB1. The data of that diagram may be accessed by all of the participants and the convener.

As can be seen in FIG. 5, participant 2 joined the telephone conference approximately five minutes after the start of the telephone conference and left the telephone conference approximately eight minutes prior to the closing of the telephone conference. Similar indications apply for the participants 3 and 5. This method requires that the meeting participants register for the telephone conference with a particular calling line, i.e., a telephone number used to call in to the telephone conference. The phone conference system PCS can then link the respective recorders R1-R4 to the respective telephones T1-T5 using Calling Line Identification (CLI), associated with these telephones T1-T5.

Based on the speech blocks SB(n) as stored by a phone conference system PCS in the voice database DB1 per participant, as well as for the convener, the phone conference system PCS, or any other system using the data, may produce the following statistics:

- average total speaking time per participant during the telephone conference;
- total speaking time per participant during the telephone conference;
- average duration of a speech block SB(n) per participant;
- interruption rate, i.e., which is either an indication of how often and how persistently a particular participant interrupted other participants of the telephone conference or how often a particular participant was interrupted by other participants.

Of course, other statistical information may be derived from the information stored in the voice database DB1. These statistics may be used for research projects, e.g., to study effectiveness and human behaviour when using web conferencing tools.

The method of the present invention may be implemented by one or more processors of a processor system as controlled by a computer program. That computer program may be stored on a data carrier like a DVD, a CD-ROM, or the like.

The invention claimed is:

1. A communication system comprising a convener communication set for a convener of a telephone conference; at least one participant communication set;
    at least one processor connected to
    at least one database and
    at least one recorder arranged to receive and record speech from at least one participant to said telephone conference,
    the convener communication set comprising a convener telephone and a convener computer arrangement, each participant communication set comprising a participant telephone and a participant computer arrangement,
    the at least one processor being arranged to:
    present an image of at least one section of a document to said convener computer arrangement and said participant computer arrangement;
    instruct said at least one recorder to record speech of said at least one participant and store recorded speech in said at least one database;
    transform said recorded speech into one or more voice clips such that said one or more voice clips can be added to the document;
    associate the one or more voice clips with locations in said at least one section such that each voice clip is associated with a certain location in said at least one section and contains speech that was spoken by said at least one participant at the time that the image of said section was shown to the at least one participant; and
    generate a graphical presentation of attendance of each of the participants to the telephone conference.

2. The communication system according to claim 1, wherein the communication system comprises
    a phone conference system connected to
    a voice database,
    a post processor connected to a post processor database and
    a net meeting system connected to a net meeting system database, the phone conference system comprising
        a phone conference processor and the net meeting system comprising
        a net meeting processor, said net meeting processor being arranged to:
        present an image of at least one section of a document to said convener computer arrangement and said participant computer arrangement;
    said phone conference processor being arranged to:
        instruct said at least one recorder to record speech of said at least one participant and store recorded speech in said voice database;
    said post processor being arranged to:
        receive said at least one section of said document and said recorded speech;
        transform said recorded speech into one or more voice clips such that said one or more voice clips can be added to the document, and
        associate these voice clips with locations in said at least one section such that each voice clip is associated with a certain location in said at least one section and contains speech that was spoken by said at least one participant at the time that the image of said section was shown to the at least one participant.

3. The communication system according to claim 1, wherein the communication system comprises
a phone conference system connected to
a voice database and
a net meeting system connected to a net meeting system the phone conference system comprising
a phone conference processor and the net meeting system comprising a net meeting processor, said net meeting processor being arranged to:
present an image of at least one section of a document to said convener computer arrangement and said participant computer arrangement;
said phone conference processor being arranged to:
instruct said at least one recorder to record speech of said at least one participant and store recorded speech in said voice database;
said net meeting processor being also arranged to:
receive said at least one section of said document and said recorded speech; transform said recorded speech into one or more voice clips such that said one or more voice clips can be added to the document, and
associate these voice clips with locations in said at least one section such that each voice clip is associated with a certain location in said at least one section and contains speech that was spoken by said at least one participant at the time that the image of the section was shown to the at least one participant.

4. The communication system according to claim 2, wherein said at least one recorder is arranged to start recording automatically when it receives a human voice signal.

5. The communication system according to claim 1, wherein said at least one recorder is arranged to record speech from each participant independent from recording speech from any other participant.

6. The communication system according to claim 2, wherein said voice database comprises speech files, and said phone conference processor is further arranged to instruct said at least one recorder to record speech of said at least one participant in the form of a series of speech blocks per participant and to store each speech block of said series of speech blocks in a speech file in said voice database together with a time at which recording of said speech block started, an identification of a participant associated with said speech block and an identification of the at least one section presented by the net meeting processor at the time at which recording of said speech block started.

7. The communication system according to claim 2, wherein said net meeting processor is also arranged to register information as to a location of a cursor in said at least one section as a function of time and to send said information to said post processor, said post processor being arranged to use said information to associate said voice dips with locations in said at least one section.

8. The communication system according to claim 3, wherein said at least one recorder is arranged to record speech of said at least one participant in the form of a series of speech blocks per participant, and said phone conference system is arranged to send individual speech blocks to said net meeting processor each time the individual speech block is recorded, said net meeting processor being arranged to include one speech block in each voice clip upon receipt of said one speech block.

9. The communication system according claim 8, wherein said phone conference system is arranged to send to said net meeting processor regarding each speech block:
an identification of a participant associated with said speech block,
a number identifying said speech block and
time at which recording of said speech block started.

10. The communication system according to claim 8, wherein said net meeting processor is also arranged to register information as to a location of a cursor in said at least one section as a function of time and to use said information to associate said voice clips with locations in said at least one section.

11. The communication system according to claim 1, wherein said at least one processor is arranged to produce data as to at least one of:
average total speaking time per participant;
total speaking time for each participant;
average duration of said voice dips; and
an interruption rate indication per participant.

12. A processing system comprising
at least one processor connected to at least one database and
at least one recorder arranged to receive and record speech from at least one participant to a telephone conference set up between a convener communication set and at least one participant communication set, said convener communication set comprising a convener telephone and a convener computer arrangement, each participant communication set comprising a participant telephone and a participant computer arrangement, the at least one processor being arranged to:
present an image of at least one section of a document to said convener computer arrangement and said participant computer arrangement;
instruct said at least one recorder to record speech of said at least one participant and store recorded speech in said at least one database;
transform said recorded speech into one or more voice dips such that said one or more voice clips can be added to the document,
associate these voice clips with locations in said at least one section such that each voice clip is associated with a certain location in said at least one section and contains speech that was spoken by said at least one participant at the time that the image of said section was shown to at least one participant; and
generate a graphical presentation of attendance of each of the participants to the telephone conference.

13. A method of associating voice clips with a document, said document being reviewed by at least one participant during a telephone conference set up between a convener communication set and at least one participant communication set, said convener communication set comprising a convener telephone and a convener computer arrangement each participant communication set comprising a participant telephone and a participant computer arrangement, the method comprising:
presenting an image of at least one section of said document to said convener computer arrangement and said participant computer arrangement;
recording speech of said at least one participant and storing recorded speech in at least one database;
transforming said recorded speech into one or more voice clips such that said one or more voice clips can be added to the document, and associating these voice clips with locations such that each voice clip is associated with a certain location in said at least one section and contains speech that was spoken by said at least one participant at the time that the image of the section was shown to the at least one participant, and generate a graphical presentation of attendance of each of the participants to the telephone conference.

14. A digital document having voice clips associated therewith, said document being reviewed by at least one participant during a telephone conference set up between a convener communication set and at least one participant communication set, said convener communication set comprising a convener telephone and a convener computer arrangement each participant communication set comprising a participant telephone and a participant computer arrangement, the method comprising:

presenting an image of at least one section of said document to said convener computer arrangement and said participant computer arrangement;

recording speech of said at least one participant and storing recorded speech in at least one database;

transforming said recorded speech into one or more voice clips such that said one or more voice clips can be added to the document, associating these voice clips with locations such that each voice clip is associated with a certain location in said at least one section and contains speech that was spoken by said at least one participant at the time that the image of the section was shown to the at least one participant, and generate a graphical presentation of attendance of each of the participants to the telephone conference.

* * * * *

UNITED STATES PATENT AND TRADEMARK OFFICE
CERTIFICATE OF CORRECTION

| | | |
|---|---|---|
| PATENT NO. | : 8,270,587 B2 | Page 1 of 1 |
| APPLICATION NO. | : 12/095737 | |
| DATED | : September 18, 2012 | |
| INVENTOR(S) | : Noldus et al. | |

It is certified that error appears in the above-identified patent and that said Letters Patent is hereby corrected as shown below:

In Column 15, Line 57, in Claim 7, delete "dips" and insert -- clips --, therefor.

In Column 16, Line 1, in Claim 9, delete "according" and insert -- according to --, therefor.

In Column 16, Line 20, in Claim 11, delete "dips;" and insert -- clips; --, therefor.

In Column 16, Line 41, in Claim 12, delete "dips" and insert -- clips --, therefor.

Signed and Sealed this
Eleventh Day of December, 2012

David J. Kappos
*Director of the United States Patent and Trademark Office*